United States Patent
Momoki

(10) Patent No.: US 10,303,949 B2
(45) Date of Patent: May 28, 2019

(54) IMAGE EVALUATION SYSTEM, IMAGE EVALUATION METHOD AND RECORDING MEDIUM STORING IMAGE EVALUATION PROGRAM

(71) Applicant: FUJIFILM Corporation, Tokyo (JP)

(72) Inventor: Yohei Momoki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 61 days.

(21) Appl. No.: 15/180,328

(22) Filed: Jun. 13, 2016

(65) Prior Publication Data

US 2017/0091552 A1 Mar. 30, 2017

(30) Foreign Application Priority Data

Sep. 28, 2015 (JP) ................................. 2015-189652

(51) Int. Cl.
*G06K 9/00* (2006.01)
*G06K 9/46* (2006.01)
*G06F 16/583* (2019.01)

(52) U.S. Cl.
CPC ..... *G06K 9/00697* (2013.01); *G06F 16/5854* (2019.01); *G06K 9/00664* (2013.01); *G06K 9/4642* (2013.01)

(58) Field of Classification Search
CPC .......... H04N 1/00196; G06F 17/30247; G06F 17/3025; G06F 17/30256; G06F 17/30259; G06F 16/5854; G06Q 50/01; G06K 9/00677; G06K 9/00684; G06K 9/00697;

(Continued)

(56) References Cited

U.S. PATENT DOCUMENTS 8,856,192 B2 * 10/2014 Choi ................. G06F 17/30256
707/803
2006/0221779 A1 * 10/2006 Matsushita ......... G06F 17/3028
369/30.01

(Continued)

FOREIGN PATENT DOCUMENTS

JP 2013-222304 A 10/2013
JP 2014-199641 A 10/2014

(Continued)

Primary Examiner — Geoffrey E Summers
(74) Attorney, Agent, or Firm — Studebaker & Brackett PC

(57) ABSTRACT

Provided are an image evaluation system, as well as an image evaluation method, and recording medium storing an image evaluation program, in which when an image is selected from among multiple images, images are evaluated in such a manner that an image such as a scenic image or still-life image will be selected with little image bias. To achieve this, an individual image composition/subject matrix is found, the matrix comprising types of composition and types of subject included in an image. A total image composition/subject matrix is obtained by adding individual image composition/subject matrices regarding respective ones of multiple images. A composition evaluation matrix and a subject evaluation matrix are found from the total image composition/subject matrix. Image evaluation values regarding respective ones of the multiple images are calculated from a matrix product of the individual image composition/subject matrix, composition evaluation matrix and subject evaluation matrix.

10 Claims, 14 Drawing Sheets

(58) Field of Classification Search
CPC ............. G06K 9/00704; G06K 9/4642; G06K 9/00691; G06K 9/00664; G06T 7/11
USPC ........................................................ 382/305
See application file for complete search history.

(56) References Cited

U.S. PATENT DOCUMENTS

| | | | |
|---|---|---|---|
| 2012/0106859 A1* | 5/2012 | Cheatle | G06T 11/60 382/225 |
| 2012/0148165 A1 | 6/2012 | Yabu | |
| 2013/0051670 A1* | 2/2013 | Das | G06F 17/30056 382/170 |
| 2013/0148864 A1* | 6/2013 | Dolson | G06K 9/00677 382/115 |

FOREIGN PATENT DOCUMENTS

| | | | | |
|---|---|---|---|---|
| JP | | 5727476 B2 | 6/2016 | |
| WO | WO 2015022689 A1 * | | 2/2015 | ......... G06F 17/3028 |

\* cited by examiner

*Fig. 7*

INDIVIDUAL IMAGE COMPOSITION/SUBJECT MATRIX $C_{img}$

| COMPOSITION \ SUBJECT | SKY | LAKE | FOREST | MOUNTAIN |
|---|---|---|---|---|
| SPLIT | 1 | 1 | 1 | 1 |
| RULE OF THIRDS | 1 | 0 | 1 | 1 |
| TRIANGULAR | 0 | 0 | 0 | 1 |

Fig. 14

TOTAL IMAGE COMPOSITION/SUBJECT MATRIX Wtotal

| TYPE OF COMPOSITION \ TYPE OF SUBJECT | PERSON | ANIMAL | FOOD | SKY | ARCHITECTURE | FLOWER | LAKE | FOREST | AUTUMN LEAVES | MOUNTAIN |
|---|---|---|---|---|---|---|---|---|---|---|
| CENTER WEIGHTED | 12 | 10 | 11 | 0 | 0 | 7 | 0 | 0 | 0 | 5 |
| SPLIT | 0 | 0 | 0 | 1 | 4 | 4 | 2 | 1 | 0 | 2 |
| RULE OF THIRDS | 3 | 0 | 1 | 13 | 1 | 1 | 4 | 5 | 1 | 4 |
| GOLDEN RATIO | 3 | 0 | 0 | 0 | 0 | 1 | 0 | 0 | 0 | 0 |
| TRIANGULAR | 2 | 1 | 0 | 3 | 4 | 0 | 0 | 0 | 2 | 6 |
| DIAGONAL 1 | 3 | 2 | 3 | 0 | 0 | 1 | 0 | 0 | 0 | 1 |
| DIAGONAL 2 | 0 | 0 | 0 | 1 | 0 | 1 | 1 | 0 | 2 | 0 |
| DIAGONAL 3 | 1 | 0 | 0 | 0 | 7 | 2 | 0 | 0 | 1 | 0 |
| SANDWICH | 0 | 1 | 0 | 0 | 3 | 0 | 0 | 0 | 0 | 0 |

Fig. 15

| TYPE OF COMPOSITION | FREQUENCY |
|---|---|
| CENTER WEIGHTED | 45 |
| SPLIT | 14 |
| RULE OF THIRDS | 33 |
| GOLDEN RATIO | 4 |
| TRIANGULAR | 16 |
| DIAGONAL 1 | 12 |
| DIAGONAL 2 | 2 |
| DIAGONAL 3 | 12 |
| SANDWICH | 4 |

Fig. 16

| TYPE OF COMPOSITION | WEIGHTING |
|---|---|
| CENTER WEIGHTED | 2 |
| SPLIT | 12 |
| RULE OF THIRDS | 4 |
| GOLDEN RATIO | 33 |
| TRIANGULAR | 4 |
| DIAGONAL 1 | 14 |
| DIAGONAL 2 | 45 |
| DIAGONAL 3 | 12 |
| SANDWICH | 16 |

*Fig. 17*

COMPOSITION EVALUATION MATRIX

| | |
|---|---|
| CENTER WEIGHTED | 0.03 |
| SPLIT | 0.19 |
| RULE OF THIRDS | 0.06 |
| GOLDEN RATIO | 0.53 |
| TRIANGULAR | 0.06 |
| DIAGONAL 1 | 0.22 |
| DIAGONAL 2 | 0.72 |
| DIAGONAL 3 | 0.19 |
| SANDWICH | 0.26 |

Fig. 18

| TYPE OF SUBJECT | FREQUENCY (WEIGHTING) |
|---|---|
| PERSON | 27 |
| ANIMAL | 17 |
| PLANT | 21 |
| SKY | 19 |
| ARCHITECTURE | 20 |
| FLOWER | 18 |
| LAKE | 9 |
| FOREST | 9 |
| AUTUMN LEAVES | 13 |
| MOUNTAIN | 22 |

Fig. 19

SUBJECT EVALUATION MATRIX Wobj

| PERSON | 0.46586 |
|---|---|
| ANIMAL | 0.29332 |
| PLANT | 0.36234 |
| SKY | 0.32783 |
| ARCHITECTURE | 0.34508 |
| FLOWER | 0.31058 |
| LAKE | 0.15529 |
| FOREST | 0.15529 |
| AUTUMN LEAVES | 0.2243 |
| MOUNTAIN | 0.37959 |

IMAGE EVALUATION SYSTEM, IMAGE EVALUATION METHOD AND RECORDING MEDIUM STORING IMAGE EVALUATION PROGRAM

CROSS-REFERENCE TO RELATED APPLICATIONS

The present invention claims priority under 35 U.S.C. § 119 to Japanese Patent Application No. 2015-189652 filed Sep. 28, 2015. Each of the above application(s) is hereby expressly incorporated by reference, in its entirety, into the present application.

BACKGROUND OF THE INVENTION

Field of the Invention

This invention relates to an image evaluation apparatus, image evaluation method and recording medium storing an image evaluation program.

Description of the Related Art

In conventional image evaluation, information such as number, sizes and positions of faces has a great influence upon image score, and images in which faces often appear tend to have a high score. An image in which a face does not appear or one in which a face appears but is small in size, as well as an image such as one that is a scenic image, will tend not to have a high score. In a case where images having a high score are selected from among a number of images and an electronic album or the like is generated, the electronic album to be generated will have many images in which faces appear because the selection is made from images having high scores. In a case where image layout editing is performed, therefore, there is a system in which desired unused images are selected from among a large quantity of unused images (Patent Document 1), a system in which images that do not deviate with regard to image content and attributes are selected (Patent Document 2), and a system for calculating specificity, which indicates the photographic condition of an object, and likelihood, which indicates the degree of certainty of the photographer of a picture, and then utilizes this specificity and degree of certainty to calculate the importance of the image (Patent Document 3).

Patent Document 1: Japanese Patent Application Laid-Open No. 2014-199641

Patent Document 2: Japanese Patent Application Laid-Open No. 2013-222304

Patent Document 3: Japanese Patent No. 5727476

According to the description rendered in Patent Document 1, the selection of images becomes one-sided because the evaluation values of images preferred by the user are high. Further, according to the description rendered in Patent Document 2, it is difficult for the same subject to be selected owing to a rise in the point score of an image that differs from an image once selected. Furthermore, according to the description rendered in Patent Document 3, since the degree of certainty of the photographer of a picture utilized, it is difficult to make a selection with regard to a picture taken by a different photographer. None of these disclosures consider a system adapted so as to select scenic images and still-life images without being biased toward images that include faces in a case where an image is selected from among a plurality of images.

SUMMARY OF THE INVENTION

An object of the present invention is to evaluate images in such a manner that when an image is selected from among a plurality of images, an image such as a scenic image or still-life image will be selected with little image bias.

An image evaluation system according to the present invention comprises: a composition information acquisition unit (composition information acquisition means) for subjecting multiple images to composition information acquisition processing for acquiring composition information representing the type of composition of each image; a subject information acquisition unit (subject information acquisition means) for subjecting multiple images to subject information acquisition processing for acquiring subject information representing the type of subject included in each image; a composition frequency calculation unit (composition frequency calculation means) for calculating frequency of appearance of a composition per type of composition with regard to the multiple images; a subject frequency calculation unit (subject frequency calculation means) for calculating frequency of appearance of a subject per type of subject included in each image with regard to the multiple images; a composition evaluation value calculation unit (composition evaluation value calculation means) for calculating a composition evaluation value per type of composition in the multiple images from the frequencies of appearance of the compositions calculated by the composition frequency calculation unit; a subject evaluation value calculation unit (subject evaluation value calculation means) for calculating a subject evaluation value per type of subject in the multiple images from the frequencies of appearance of the subjects calculated by the subject frequency calculation unit; and an image evaluation value calculation unit (image evaluation value calculation means) for calculating an image evaluation value with regard to each of the multiple images from the composition evaluation value calculated by the composition evaluation value calculation unit and the subject evaluation value calculated by the subject evaluation value calculation unit.

The present invention provides also an image evaluation method. Specifically, the method comprises the steps of: a composition information acquisition unit subjecting multiple images to composition information acquisition processing for acquiring composition information representing the type of composition of each image; a subject information acquisition unit subjecting the multiple images to subject information acquisition processing for acquiring subject information representing the type of subject included in each image; a composition frequency calculation unit calculating frequency of appearance of a composition per type of composition with regard to the multiple images; a subject frequency calculation unit calculating frequency of appearance of a subject per type of subject included in each image with regard to the multiple images; a composition evaluation value calculation unit calculating a composition evaluation value per type of composition in the multiple images from the frequencies of appearance of the compositions calculated by the composition frequency calculation unit; a subject evaluation value calculation unit calculating a subject evaluation value per type of subject in the multiple images from the frequencies of appearance of the subjects calculated by the subject frequency calculation unit; and an image evaluation value calculation unit calculating an image evaluation value with regard to each of the multiple images from the composition evaluation value calculated by the composition evaluation value calculation unit and the subject evaluation value calculated by the subject evaluation value calculation unit.

The composition evaluation value calculation unit may calculate a larger composition evaluation value the lower the frequency of appearance calculated by the composition frequency calculation unit. Conversely, the composition evaluation value calculation unit may calculate a larger composition evaluation value the higher the frequency of appearance calculated by the composition frequency calculation unit.

The subject evaluation value calculation unit calculates a larger subject evaluation value the higher the frequency of appearance calculated by the subject frequency calculation unit. Conversely, the subject evaluation value calculation unit calculates a larger subject evaluation value the lower the frequency of appearance calculated by the subject frequency calculation unit.

The image evaluation value calculation unit finds, for each of the multiple images, an individual image composition/subject matrix having two axes one of which is an axis of multiple compositions and the other of which is an axis of the multiple subjects, wherein a value of 1 is taken on in a case where one composition and one subject exist and a value of 0 is taken on otherwise; finds a composition evaluation matrix comprising one row or one column using composition evaluation values calculated by the composition evaluation value calculation unit; finds a subject evaluation matrix comprising one row or one column using subject evaluation values calculated by the subject evaluation value calculation unit; and calculates an image evaluation value with regard to each of the multiple images using a matrix product of the individual image composition/subject matrix, the composition evaluation matrix and the subject evaluation matrix.

The system may further comprise a decision unit (decision means) for deciding n-number of images for which the image evaluation value calculated by the image evaluation value calculation unit is large, where n represents a natural number.

The system may further comprise an electronic album generating unit (electronic album generating means) for generating an electronic album using the images decided by the decision unit.

In accordance with the present invention, multiple images are subjected to composition information acquisition processing for acquiring composition information representing type of composition, and a composition evaluation value per type of composition is calculated from the number of times a composition appears per type of composition. Further, multiple images are subjected to subject information acquisition processing for acquiring subject information representing type of subject, and a subject evaluation value per type of subject is calculated from the number of times a subject appears per type of subject. An image evaluation value is calculated from the composition evaluation value and the subject evaluation value. An image is evaluated taking composition type and subject type into consideration. In a case where images are selected based upon image evaluation values, therefore, images such as scenic images and still-life images will be selected without bias toward images that include faces.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is an example of a composition matrix;

FIG. 14 is an example of a total image composition/subject matrix;

FIG. 15 is an example of a composition appearance frequency table;

FIG. 16 is an example of a composition weighting table;

FIG. 17 is an example of a composition evaluation matrix;

FIG. 18 is an example of a subject appearance frequency table; and

FIG. 19 is an example of a subject evaluation matrix.

DESCRIPTION OF THE PREFERRED EMBODIMENT

A preferred embodiment of the present invention will now be described in detail with reference to the accompanying drawings.

Figure 1:
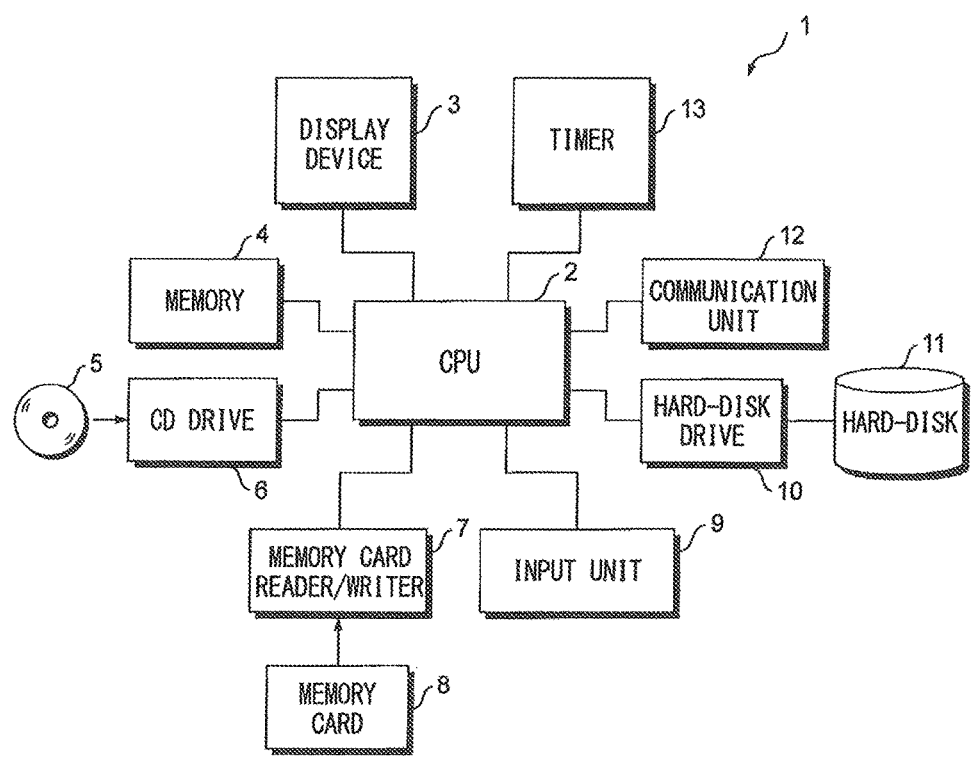
FIG. 1 is a block diagram illustrating the electrical configuration of an image evaluation system.

FIG. 1 illustrates an embodiment of the present invention and is a block diagram showing the electrical configuration of an image evaluation system 1.

The overall operation of the image evaluation system 1 is controlled by a CPU (Central Processing Unit) 2.

The image evaluation system 1 includes a display device 3 for displaying images and the like on a display screen, a memory 4 storing data and the like, and a CD (Compact Disc) drive 6 for accessing data and the like recorded on the compact disc 5. The image evaluation system 1 further includes a memory card reader/writer 7 for reading an image file from a memory card 8, which stores image files representing images, and recording the image file on the memory card 8, and an input unit 9 for applying various commands to the image evaluation system 1. The image evaluation system 1 further includes a hard disk 11, a hard-disk drive 10 for accessing the hard disk 11, a communication unit 12 for communicating with another computer or the like, and a timer 13.

When the memory card 8 is loaded in the image evaluation system 1 and an image file is read by the memory card reader/writer 7, image evaluation is carried out in a manner described later. In a case where an image has been stored not on the memory card 8 but on the compact disc 5 or on some other medium, the image that has been stored on the disk or other medium is read. The image evaluation system 1 would be provided with a reading device suitable for reading images stored on media. Further, in a case where an image is applied to the image evaluation system 1 via a network such as the Internet, the image is received by the communication unit 12 and the received image is applied to and stored in the memory 4. The image represented by the image file thus stored is evaluated.

The compact disc 5 (recording medium) contains a program readable by the CPU 2 (computer) of the image evaluation system 1 for controlling processing described later. By loading the compact disc 5 in the image evaluation system 1, the program stored on the compact disc 5 is installed in the image evaluation system 1. The program may be transmitted to the image evaluation system 1 via a network such as the Internet. The program is received by the communication unit 12 and the received program is installed in the image evaluation system 1.

Figure 2:
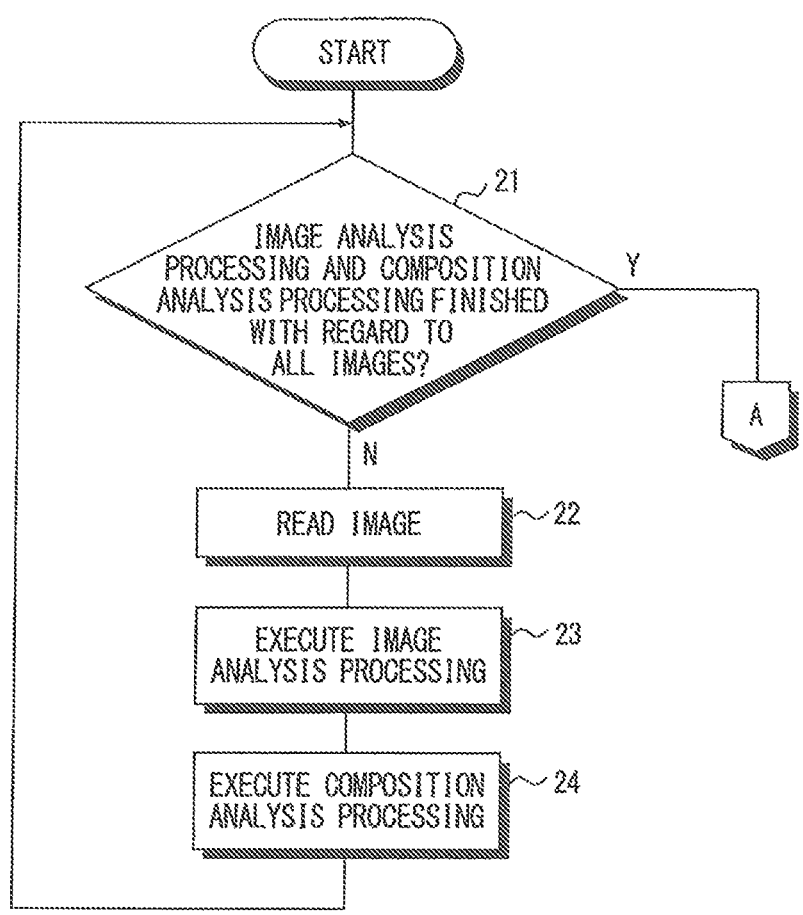
FIGS. 2 and 3 are flowcharts illustrating processing executed by an image evaluation system.
Figure 3:
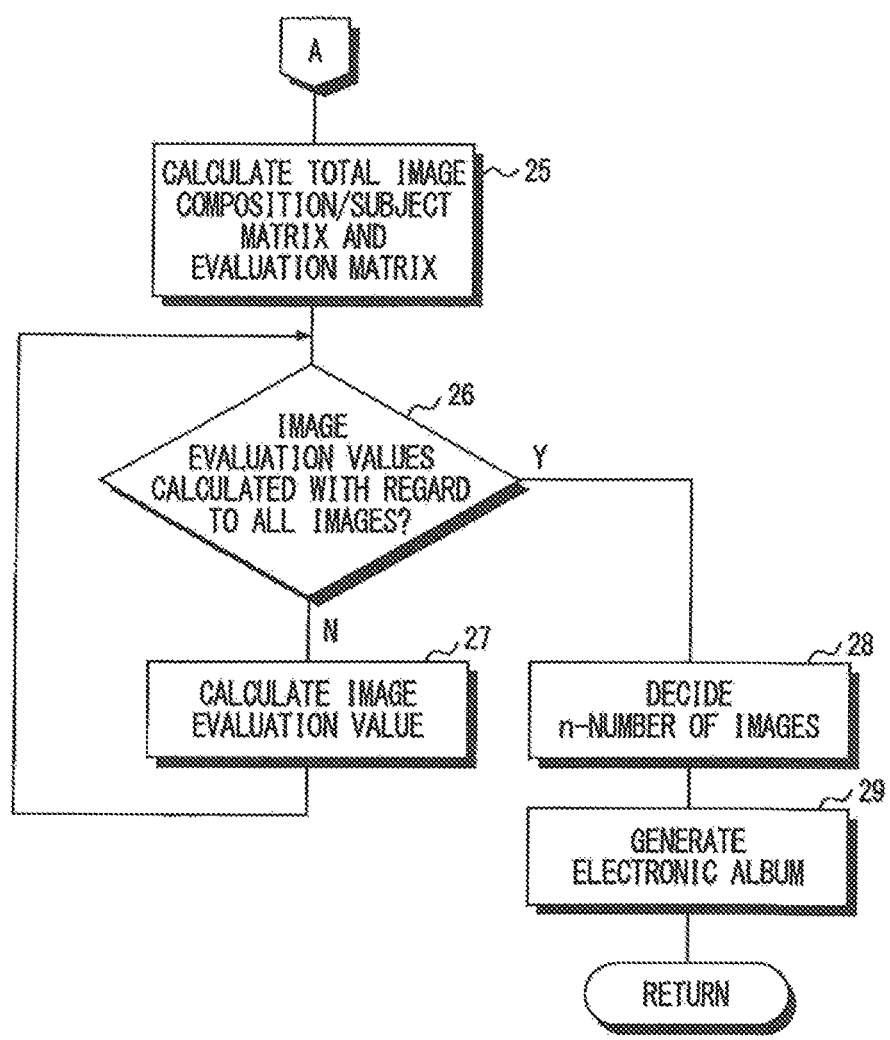

FIGS. 2 and 3 are flowcharts illustrating processing executed by the image evaluation system 1.

In the image evaluation system 1, multiple image files representing images are read from the memory card 8 and image evaluation is carried out utilizing the multiple images. The multiple image files read from the memory card 8 are stored in the memory 4 temporarily.

First, the CPU 2 verifies whether or not image analysis processing and composition analysis processing has ended with regard to the multiple images represented by the multiple image files (step 21). If these processings have not ended ("NO" at step 21), the CPU 2 reads the image file representing the first image among the multiple image files that have been stored (step 22).

The CPU 2 applies image analysis processing to the image represented by the image file read (step 23). As a result of image analysis processing, the CPU 2 acquires analytical information including tag information and area information contained in the header of the image file. The tag information is information representing the types of subjects included in the image represented by the image file. The area information is information indicating the areas of the subjects included in the image. Subject information acquisition processing for acquiring subject information representing the types of subjects included in each image and area information acquisition processing for acquiring the positions of the subjects in each image is executed by the CPU 2 with regard to the multiple images. The tag information need not be contained in the header of the image file but may be stored in a tag information table or the like, which is different from the image, in association with the image. Further, there need be no tag information per se. In a case where there is no tag information, the image is subjected to image analysis by the CPU 2 and the types of subjects included in the image are detected. Further, the area information need not be contained in the header of the image file but may be stored in an area information table or the like, which is different from the image, in association with the image. Further, there need be no area information per se. In a case where there is no area information, the image is subjected to image analysis by the CPU 2, the subjects are detected and the areas of the detected subjects are detected for every type of subject.

Figure 4:
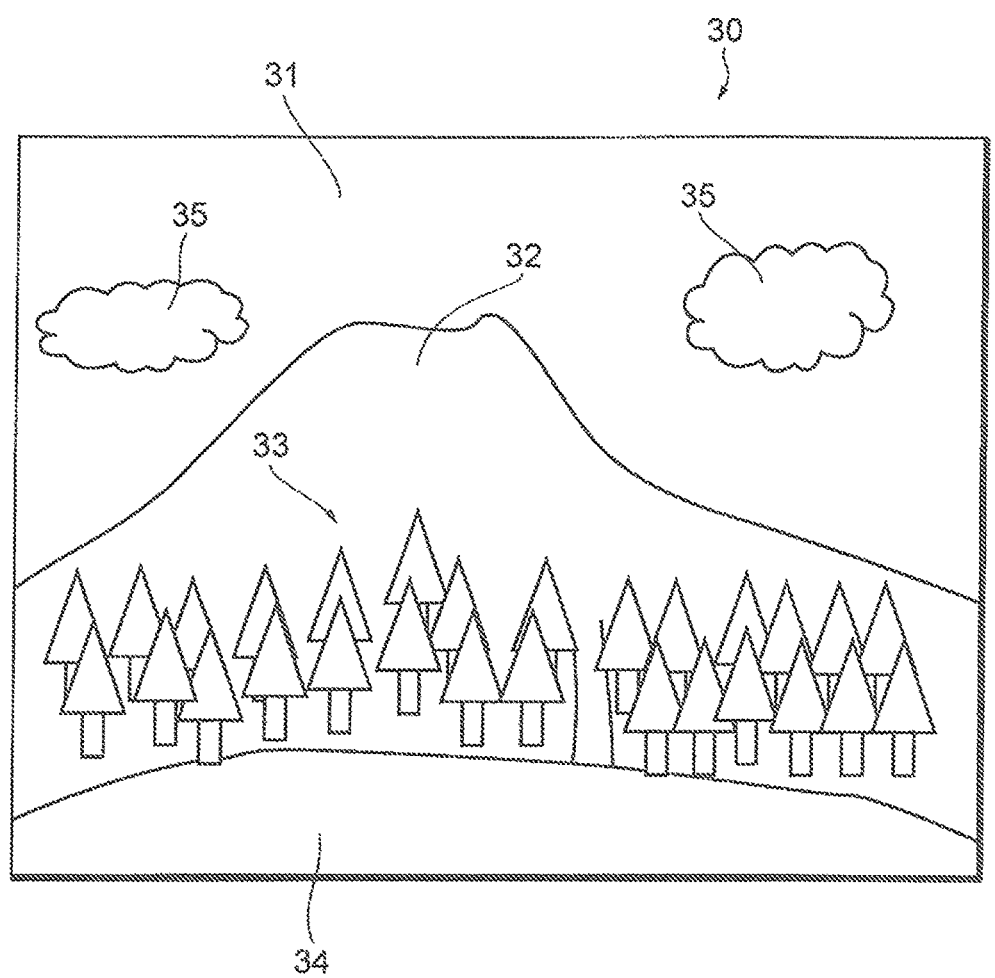
FIG. 4 is an example of an image.

FIG. 4 is an example of an image 30 represented by an image file read by the CPU 2.

The image 30 is a scenic image and includes sky 31, a mountain 32, a forest 33, a lake 34 and clouds 35 as subjects.

Figure 5:
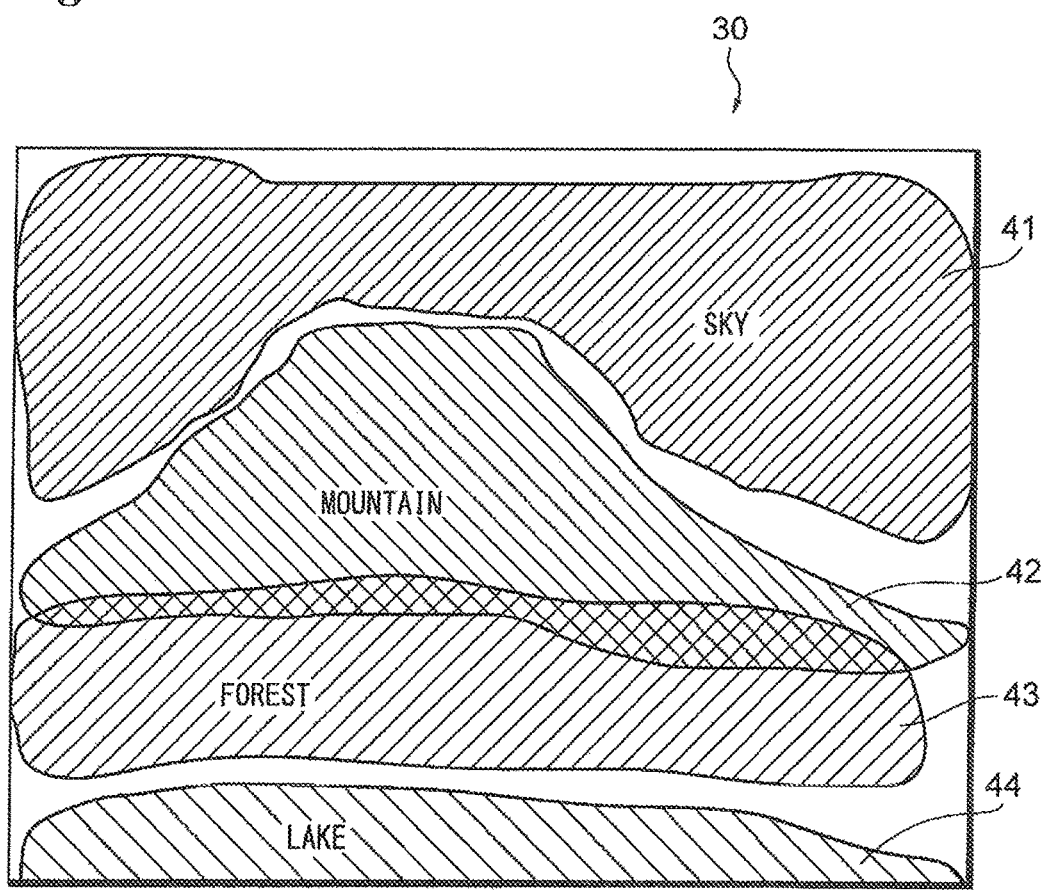
FIG. 5 illustrates how an image is analyzed.

FIG. 5 illustrates the result of subjecting the image 30 to image analysis.

Tag information and area information about the image 30 are obtained by analyzing the image 30. From the tag information and area information obtained, the CPU 2 detects that the image 30 has the sky 31 in an area 41, the mountain 32 in an area 42, the forest 33 in an area 43, and the lake 34 in the area 44. Although the clouds 35 have not been detected, it may be arranged so that the clouds are detected. In a case where there is no tag information and area information concerning the image 30, the image 30 is analyzed by the CPU 2 and it is detected that the sky 31, mountain 32, forest 33 and lake 34 are in the areas 41, 42, 43, 44 and 45, respectively.

When image analysis is carried out, composition analysis processing is executed by the CPU 2 for every subject obtained in image analysis (step 24).

Figure 6:
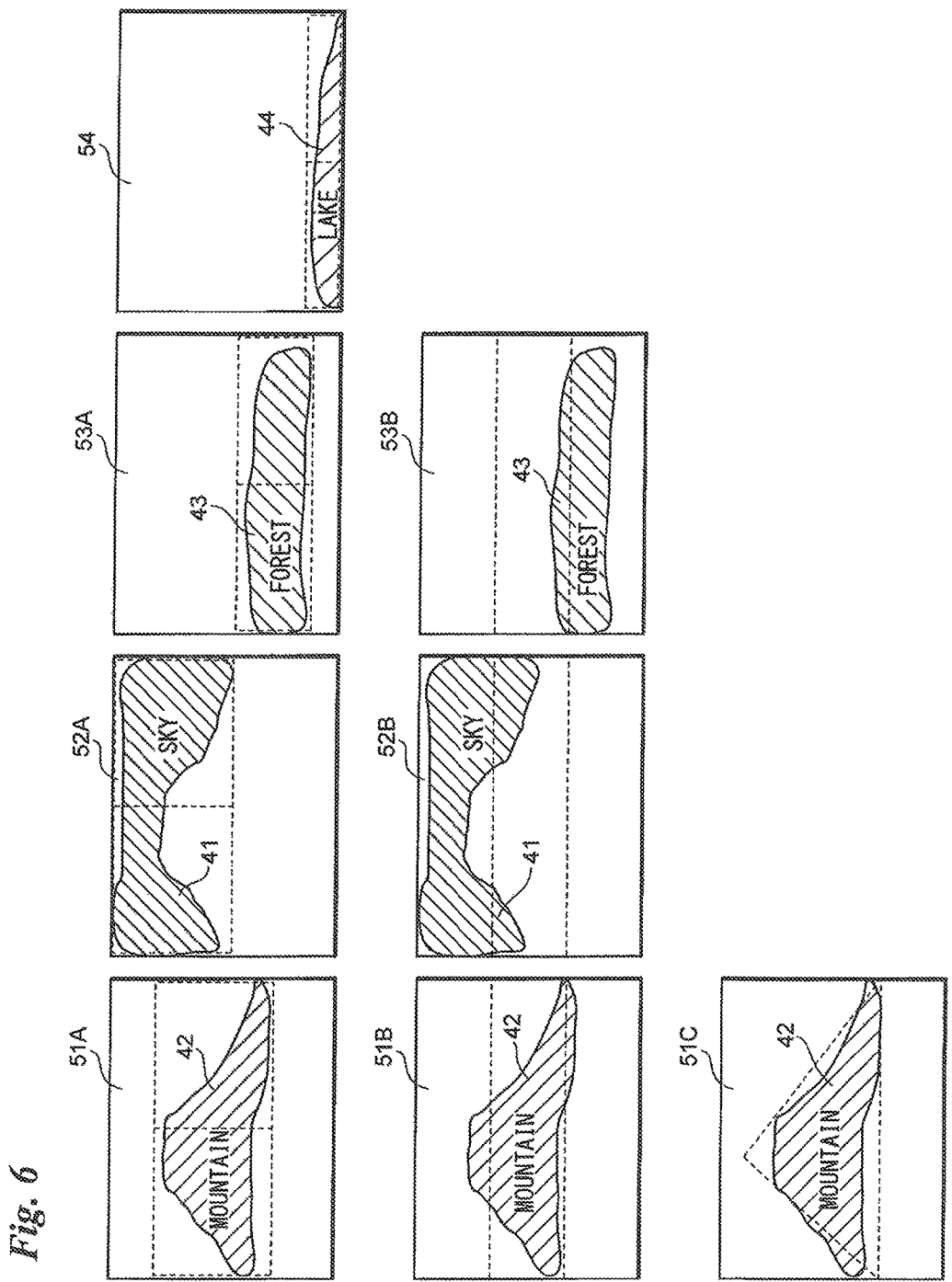
FIG. 6 illustrates the manner in which composition analysis processing is executed.

FIG. 6 illustrates the manner in which image analysis processing is executed.

By virtue of image analysis, it is detected that the area 42 of mountain 32 has been captured by adopting split composition, rule-of-thirds composition and triangular composition (each indicated by the dashed lines), as indicated at 51A, 51B and 51C, respectively. Split composition refers to composition in a case where the subject is captured in approximate left-right symmetry about the center. Rule-of-thirds composition refers to composition in a case where, if an image is divided vertically into three equal portions, the subject is divided into each of the three portions. Triangular composition refers to composition in a case where the subject approximately fits into a triangle.

Further, as a result of image analysis, the CPU 2 acquires composition information indicating that the area 41 of sky 31 has been captured by adopting split composition and rule-of-thirds composition, as illustrated in FIGS. 52A and 52B. Similarly, the CPU 2 acquires composition information indicating that the area 43 of forest 33 has also been captured by adopting split composition and rule-of-thirds composition, as illustrated in FIGS. 53A and 53B. Furthermore, the CPU 2 acquires composition information indicating that the area 44 of lake 34 has been captured by adopting split composition, as illustrated in FIG. 54.

Composition information acquisition processing for acquiring the composition information representing the type of composition (image composition) of a subject included in an image is thus executed with regard to multiple images by the CPU 2 (composition information acquisition unit). Although composition information about image 30 is acquired by composition analysis processing, in a case where composition information is contained in the header of the image file representing the image 30 or in a composition information table or the like different from the image, the reading of the composition information from the header or composition information table or the like will constitute the image analysis processing. Further, a composition matrix about the image is generated by the image analysis processing.

FIG. 7 is an example of an individual image composition/subject matrix Cimg. As will be described later, this embodiment is such that there are nine types of composition and ten types of subject, so that the number of times each appears is required to be calculated and expressed in Cimg. To facilitate the description, however, the calculations will be performed assuming that there are three types of composition and four types of subject in the individual image composition/subject matrix Cimg of FIG. 7.

Each element of the matrix rows indicates, per composition, the number of times a subject included in the image 30 appears. Each element of the matrix columns indicates, per subject, the number of times the composition of the subject included in the image 30 appears. If FIGS. 6 and 7 are compared, it will be understood that the composition of the area 41 of sky 31 appears once as a split composition and once as a rule-of-thirds composition, the composition of the area 44 of lake 34 appears once as a split composition, the composition of the area 43 of forest 33 appears once as a split composition and once as a rule-of-thirds composition, and the composition of the area 42 of mountain 32 appears once as a split composition, once as a rule-of-thirds composition and once as a triangular composition. The individual image composition/subject matrix Cimg has two axes, namely the multiple compositions and the multiple subjects, and a value of 1 is taken on in a case where one composition and one subject exist and a value of 0 is taken on otherwise.

Image analysis processing and composition analysis processing is executed with regard to multiple images, and the individual image composition/subject matrix Cimg, which has a number of rows equivalent to the number of types of composition and a number of columns equivalent to the number of types of subject, is obtained by the CPU 2 in a number equivalent to the number of images.

FIGS. 8 to 13 illustrate examples of compositions other than those mentioned above.

Figure 8:
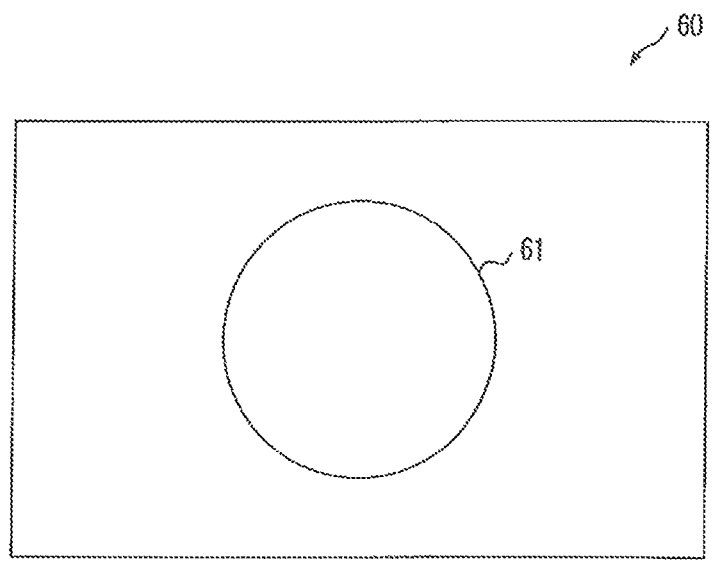
FIG. 8 is an example of a center-weighted composition.

FIG. 8 is an example of a center-weighted composition 60.

The center-weighted composition 60 is a composition in which an important subject is placed in a central area 61. If an important subject is present in the central area 61, the CPU 2 determines that this important subject has been captured in accordance with the center-weighted composition 60.

Figure 9:
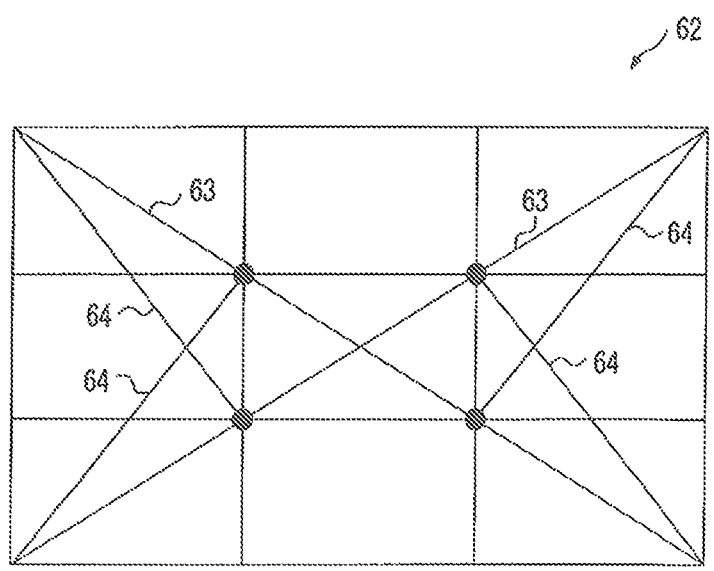
FIG. 9 is an example of a golden-ratio composition.

FIG. 9 is an example of a golden-ratio composition 62.

The golden-ratio composition 62 is one in which, when diagonals 63 are drawn from four corners and straight lines 64 are drawn from the four corners so as to meet the diagonals 63 are right angles, subjects are placed at the intersections of the diagonals 63 and straight lines 64. If a subject is present at such intersections, the CPU 2 determines that the subject has been captured in accordance with the golden-ratio composition 62.

Figure 10:
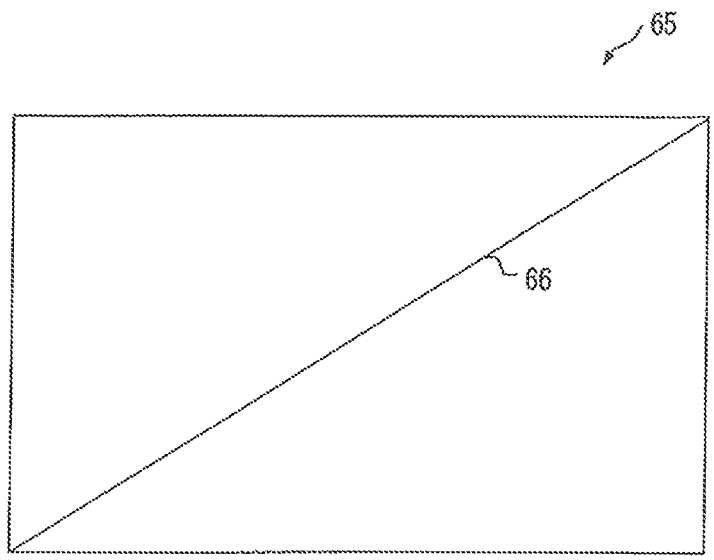
FIG. 10 is an example of a first diagonal composition.

FIG. 10 is an example of a first diagonal composition 65.

The first diagonal composition 65 is one in which, when a diagonal 66 is drawn between two opposing vertices, the outline of a subject is placed at position stipulated by the diagonal 66. If a subject is present in such a composition, the CPU 2 determines that the subject has been captured in accordance with the first diagonal composition 65.

Figure 11:
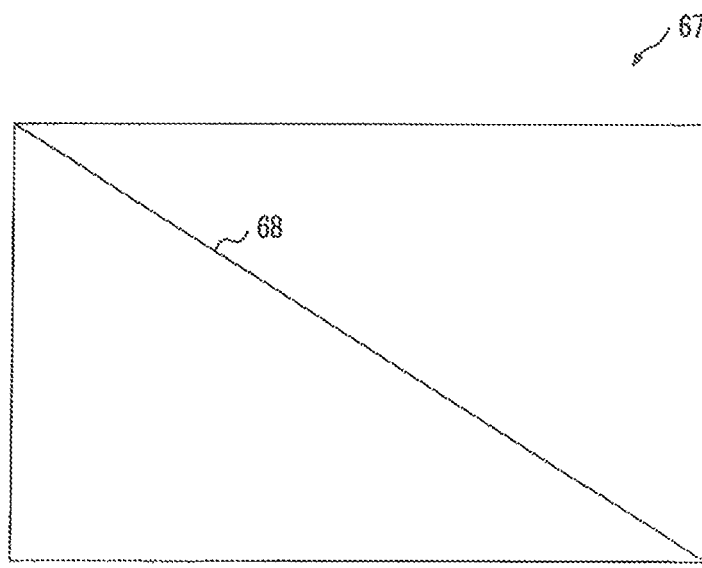
FIG. 11 is an example of a second diagonal composition.

FIG. 11 is an example of a second diagonal composition 67.

The second diagonal composition 67 is one in which, when a diagonal 68, which is different from the first diagonal composition 65 shown in FIG. 10, is drawn between two opposing vertices, the outline of a subject is placed at position stipulated by the diagonal 68. If a subject is present in such a composition, the CPU 2 determines that the subject has been captured in accordance with the second diagonal composition 67.

Figure 12:
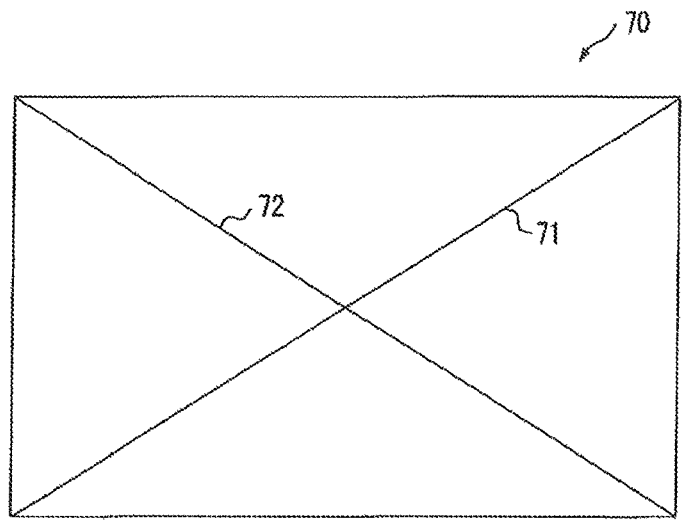
FIG. 12 is an example of a third diagonal composition.

FIG. 12 is an example of a third diagonal composition 70.

The third diagonal composition 70 is one obtained by combining the first diagonal composition 65 shown in FIG. 10 and the second diagonal composition 67 shown in FIG. 11. Sets of two opposing vertices are connected two diagonals 71 and 72. The third diagonal composition 70 is a composition in which the outline of a subject is placed at a position stipulated by the diagonals 71 and 72. If a subject is present in such a composition, the CPU 2 determines that the subject has been captured in accordance with the third diagonal composition 70.

Figure 13:
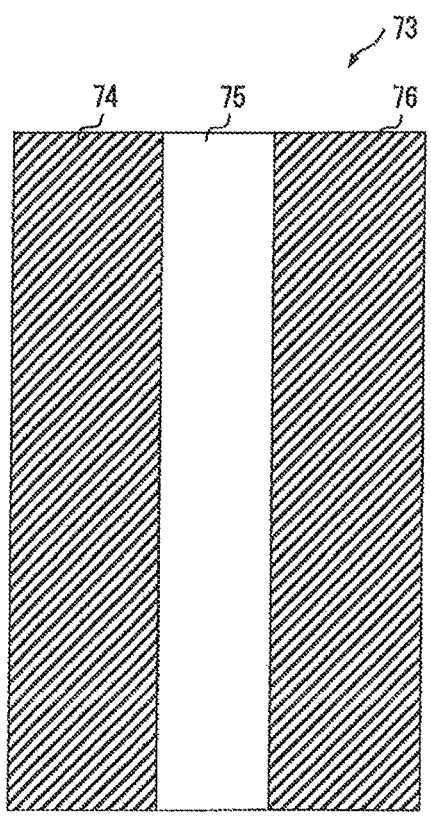
FIG. 13 is an example of a sandwich composition.

FIG. 13 is an example of a so-called "sandwich composition" 73.

The sandwich composition 73 is one in which a central area 75 is sandwiched between areas 74 and 76 on both sides of the area 75. (FIG. 13 illustrates sandwiching in the transverse direction, although sandwiching in the longitudinal direction exists as well.) This is a composition in which a subject (a tower, for example) is placed across the entirety of the central area 75 in such a manner that the subject is captured from a gap between buildings. If a subject is present in such a composition, the CPU 2 determines that the subject has been captured in accordance with the sandwich composition 73.

With reference again to FIG. 2, the image analysis processing and composition analysis processing end with regard to the multiple images, an individual image composition/subject matrix Cimg, which has a number of rows equivalent to the number of types of composition and a number of columns equivalent to the number of types of subject (nine rows and 10 columns in this embodiment), is generated with regard to each of the multiple images ("YES" at step 21), and these multiple individual image composition/subject matrices Cimg are added by the CPU 2 to thereby generate a total image composition/subject matrix Wtotal (nine rows and 10 columns) (step 25 in FIG. 3).

FIG. 14 is an example of a total image composition/subject matrix Wtotal.

In a manner similar to that of the individual image composition/subject matrix Cimg, each element of the matrix rows of the total image composition/subject matrix Wtotal indicates, per composition, the number of times a subject included in the multiple images appears, and each element of the matrix columns of the total image composition/subject matrix Wtotal indicates, per subject, the number of times the composition of the subject included in the multiple images appears.

The total image composition/subject matrix Wtotal is used to ascertain the numbers of times compositions appear and the numbers of times subjects appear in the multiple images.

Further, the CPU 2 generates a composition evaluation matrix Wcmp and a subject evaluation matrix Wobj (step 25).

FIGS. 15 to 17 illustrate the process through which the composition evaluation matrix Wcmp is generated.

FIG. 15 is an example of a composition appearance frequency table.

The composition appearance frequency table is the result of collecting, per type of composition, the number of times the composition appeared in multiple images. The composition appearance frequency table is obtained by adding up the values of the total image composition/subject matrix Wtotal, shown in FIG. 14, per type of composition irrespective of the types of subject. The composition appearance frequency table is generated by the CPU 2 (composition frequency calculation unit) and is obtained by calculating the number of times a composition appears per type of composition with regard to multiple images. A composition having a high frequency of occurrence can be considered to be a commonplace composition. In this embodiment, therefore, a composition weighting table is generated such that the greater the number of times a composition appears, the smaller the weighting applied.

FIG. 16 is an example of a composition weighting table.

The composition weighting table is the result of collecting weightings, per type of composition, in such a manner that the greater the number of times a composition appears in multiple images, the smaller the weighting. The composition weighting table is generated by the CPU 2. The weightings are the result of assigning, in an order that is the reverse of the number of appearances, the number of times compositions appear per type of composition obtained from the composition appearance frequency table shown in FIG. 15. For example, the number times the center-weighted composition appears is a maximum of 45 and the number of times the second diagonal composition appears is a maximum of 2. Therefore, the order of these numbers of appearances is reversed so that the weighting of the center-weighted composition is now 2 and the weighting of the second diagonal composition is now 45. The smaller a weighting in the composition weighting table, the more commonplace the composition; the greater a weighting in the composition weighting table, the rarer the composition.

The composition evaluation matrix Wcmp is generated when the composition weighting table is generated.

FIG. 17 is an example of the composition evaluation matrix Wcmp.

The composition evaluation matrix Wcmp is found using composition evaluation values (weightings) and is a matrix consisting of one column (or a matrix consisting of one row). Each element of the composition evaluation matrix Wcmp (nine rows and one column in this embodiment) is obtained by considering the dimensions of the number of types of composition included in the composition weighting table of FIG. 16 (nine dimensions because there are nine types of composition in this embodiment), calculating the length of the vector in the dimension per type of composition and then normalizing the result. For example, the weighting of the center-weighted composition is 2, and 0.03 is the element of the center-weighted composition in the composition evaluation matrix Wcmp. The value of 0.03 is found as follows: $2/\sqrt{[}$(weighting of center-weighted composition)$^2$+(weighting of split composition)$^2$+(weighting of rule-of-thirds composition)$^2$+(weighting of golden ratio composition)$^2$+(weighting of triangular composition)$^2$+(weighting of first diagonal composition)$^2$+(weighting of second diagonal composition)$^2$+(weighting of third diagonal composition)$^2$+(weighting of sandwich composition)$^2] = 2/\sqrt{[(2)^2+(12)^2+(4)^2+(33)^2+(4)^2+(14)^2+(45)^2+(12)^2+(16)^2]} = 2/\sqrt{(3890)} = 2/62.37 = 0.03$. The other elements are obtained in a similar manner. The generation of the composition evaluation matrix Wcmp by the CPU 2 (composition evaluation value calculation unit) involves calculating the composition evaluation value per type of composition in multiple images from the calculated numbers of times the compositions appear. The composition evaluation matrix Wcmp thus found is such that the smaller the number of times a composition appears, the higher the composition evaluation value applied as appreciated from the calculation process described above.

FIGS. 18 and 19 illustrate the process through which the subject evaluation matrix Wobj is generated.

FIG. 18 is an example of a subject appearance frequency table.

The subject appearance frequency table is the result of collecting, per type of subject, the number of times the subject appeared in multiple images. The subject appearance frequency table is obtained by adding up the values of the total image composition/subject matrix Wtotal, shown in FIG. 14, per type of subject irrespective of the types of composition. The larger the number of times a subject appears, which is obtained from the subject appearance frequency table, the more the subject is considered to be in line with user preference. The subject appearance frequency table is generated by the CPU 2 (subject frequency calculation unit). The generation of the subject appearance frequency table involves calculating the number of times a subject appears per type of subject included in each of multiple images.

The subject evaluation matrix Wobj is generated when the subject appearance frequency table is generated.

FIG. 19 is an example of the subject evaluation matrix Wobj.

The subject evaluation matrix Wobj also is a matrix consisting of one column (or a matrix consisting of one row) obtained utilizing the calculated subject evaluation values. Each element of the subject evaluation matrix Wobj (ten rows and one column in this embodiment) is obtained by considering the dimensions of the number of types of subject included in the subject appearance frequency table of FIG. 18 (ten dimensions because there are ten types of subject in this embodiment), calculating the length of the vector in the dimension per type of subject and then normalizing the result. For example, the number of times a person appears as a subject is 27, and 0.46586 is the element of a person in the subject evaluation matrix Wobj. The value of 0.46586 is found as follows: $27/\sqrt{[}$(number of times a person appears)$^2$+(number of times an animal appears)$^2$+(number of times food appears)$^2$+(number of times the sky appears)$^2$+(number of times architecture appears)$^2$+(number of times a flower appears)$^2$+(number of times a lake appears)$^2$+(number of times a forest appears)$^2$+(number of times autumn leaves appear)$^2$+(number of times a mountain appears)$^2] = 27/\sqrt{[(27)^2+(17)^2+(21)^2+(19)^2+(20)^2+(18)^2+(9)^2+(9)^2+(13)^2+(22)^2]} = 27/\sqrt{(3359)} = 27/57.956 = 0.46586$. The other elements are obtained in a similar manner. The subject evaluation matrix Wobj also is generated by the CPU 2. The generation of the subject evaluation matrix Wobj involves calculating the subject evaluation value per type of subject in multiple images from the numbers of times the subjects appear. The subject evaluation matrix Wobj thus found is such that the larger the number of times a subject appears, the higher the subject evaluation value applied as appreciated from the calculation process described above.

When the total image composition/subject matrix Wtotal, composition evaluation matrix Wcmp and subject evaluation matrix Wobj are thus calculated, image evaluation values are calculated with regard to respective ones of the multiple images until image evaluation values are calculated with regard to all of the images (steps 26, 27 in FIG. 3).

An image evaluation value is expressed by the following Equation (1) using a matrix product of the individual image composition/subject matrix Cimg (nine rows and ten columns) of the image whose evaluation value is to be calculated, the subject evaluation matrix Wobj (ten rows and one column) and a transposed matrix $^tWcmp$ (one row and nine columns) of the composition evaluation matrix:

$$\text{image evaluation value} = k C_{img} W_{obj} {}^t W_{cmp} \qquad \text{Eq. (1)}$$

where a represents k constant stipulating that the image evaluation value is between 0 and 1.

In accordance with Equation (1), image evaluation values are calculated by the CPU 2 (image evaluation value calculation unit) with regard to all of the multiple images. Image evaluation values are calculated with regard to respective ones of the multiple images from the composition evaluation values and subject evaluation values. It should be noted that, in image evaluation in this embodiment, it will suffice to find one value with respect to one image, i.e., it will suffice if the product of the matrices can be defined. Therefore, the image evaluation value can also be calculated by $k^t W_{cmp} C_{img} W_{obj}$, $k^t C_{img} W_{cmp} W_{obj}$, $k^t W_{obj} {}^t C_{img} W_{cmp}$, etc., instead of Equation (1).

When image evaluation values are calculated with regard to all of the multiple images ("YES" at step 26), n-number of images (where n represents a natural number) for which the image evaluation value is high are decided by the CPU 2 (step 28). The n-number of images decided are pasted into an electronic album template by the CPU 2 (electronic album generating unit), thereby generating an electronic album (step 29). If an element in the composition evaluation matrix Wcmp is a composition that is rare among the multiple images, the value thereof will be high. As a consequence, too many commonplace compositions of images are prevented from being included in the electronic album generated. This is significant because a user not very familiar with composition can obtain an electronic album in which rare compositions rather than commonplace compositions are given priority without the user acquiring knowledge about composition. Further, since the greater the number of times a subject appears, the larger the value of the element in the subject evaluation matrix Wobj, many subjects in which the user has been interest will be included in the electronic album. The electronic album generated will be devoid of bias such as the inclusion of many faces regardless of the fact that subjects other than people exist.

In the foregoing embodiment, the composition evaluation matrix Wcmp shown in FIG. 17 is generated utilizing the composition weighting table illustrated in FIG. 16, and the rarer the composition, the higher the value of the matrix element. That is, the smaller the number of times a composition appears, the higher the composition evaluation value. However, in the case of a user who is very familiar with composition, the larger the number of times a composition appears, the more this composition will be in line with user preference and, hence, the user's preference should be respected. Accordingly, it may be arranged so as to generate the composition evaluation matrix Wcmp by utilizing the composition appearance frequency table shown in FIG. 15 (without the procedural step of reversing the order to the number of appearances). As a result, the composition evaluation matrix Wcmp will be such that the larger the number of times a composition appears, the larger the composition evaluation value applied. Images thus decided will include many images having compositions in line with user preference.

Further, the subject evaluation matrix Wobj shown in FIG. 19 is generated by utilizing the subject appearance frequency table illustrated in FIG. 18, and the larger the number of times a subject appears, the larger the value of the matrix element. That is, the larger the number of times a subject appears, the larger the evaluation value of the subject. However, in a case where a picture of a wild animal or the like has been taken, such a subject having a low frequency of appearance will be one representing a precious photo opportunity, and such a picture should be favored. Accordingly, it may be arranged so as to generate a subject weighting table, by using a method the same as that used for the composition weighting table of FIG. 16 (by a procedure that reverses the order of the number of appearances) from the subject appearance frequency table of FIG. 18 in such a manner that the weighting of subjects having a low frequency of appearance will increase, and generate the subject evaluation matrix Wobj from this generated subject weighting table. As a result, the subject evaluation matrix Wobj will be such that the smaller the number of times a subject appears, the higher the subject evaluation value applied. Images thus decided will include comparatively many images in which rare subjects having a low frequency of appearance show up. Furthermore, it is permissible to adopt a setup in which, depending upon a difference in the purpose of photography or in the standpoint of image evaluation, the user applies a high composition evaluation value to either a composition having a low frequency of appearance or a composition having a high frequency of appearance or applies a high subject evaluation value to a subject having a high frequency of appearance or a subject having a low frequency of appearance whenever image evaluation is performed.

As many apparently widely different embodiments of the present invention can be made without departing from the spirit and scope thereof, it is to be understood that the invention is not limited to the specific embodiments thereof except as defined in the appended claims.

What is claimed is:

1. An image evaluation system comprising:
a processor communicatively coupled to a memory including instructions, wherein the processor is configured to execute the instructions to perform processes of:
subjecting multiple images to composition information acquisition processing for acquiring composition information representing the type of composition of each image;
subjecting the multiple images to subject information acquisition processing for acquiring subject information representing the type of subject included in each image;
calculating frequency of appearance of a composition per type of composition with regard to the multiple images;
calculating frequency of appearance of a subject per type of subject included in each image with regard to the multiple images;
calculating a composition evaluation value per type of composition in the multiple images from the calculated frequencies of appearance of the compositions;
calculating a subject evaluation value per type of subject in the multiple images from the calculated frequencies of appearance of the subjects;
finding, for each of the multiple images, an individual image composition/subject matrix having two axes, one of which is an axis of multiple compositions, and the other of which is an axis of the multiple subjects, wherein a value of 1 is taken on in a case where one composition and one subject exist and a value of 0 is taken on otherwise;
finding a composition evaluation matrix comprising one row or one column using the calculated composition evaluation values;
finding a subject evaluation matrix comprising one row or one column using the calculated subject evaluation values;
calculating an image evaluation value with regard to each of the multiple images using a matrix product of the individual image composition/subject matrix, the composition evaluation matrix and the subject evaluation matrix;
deciding n-number of images for which the image evaluation value is large, where n represents a natural number; and
displaying the n-number of images on a display screen.

2. The system according to claim 1, wherein the processor is configured to execute the instructions to perform processes of: calculating a larger composition evaluation value the lower the calculated frequency of appearance.

3. The system according to claim 1, wherein the processor is configured to execute the instructions to perform processes of: calculating a larger composition evaluation value the higher the calculated frequency of appearance.

4. The system according to claim 1, wherein the processor is configured to execute the instructions to perform processes of: calculating a larger subject evaluation value the higher the calculated frequency of appearance.

5. The system according to claim 1, wherein the processor is configured to execute the instructions to perform processes of: calculating a larger subject evaluation value the lower the calculated frequency of appearance.

6. The system according to claim 1, wherein the processor is configured to execute the instructions to perform processes of: generating an electronic album using the decided images.

7. The system according to claim 1, wherein the processor is configured to execute the instructions to perform processes of: generating an electronic product using the decided images.

8. The system according to claim 1, wherein the processor is configured to execute the instructions to perform processes of: generating an electronic product using the decided images, which are selected without the bias toward the images that include the faces.

9. An image evaluation method comprising steps of:
subjecting multiple images to composition information acquisition processing for acquiring composition information representing the type of composition of each image;
subjecting the multiple images to subject information acquisition processing for acquiring subject information representing the type of subject included in each image;
calculating frequency of appearance of a composition per type of composition with regard to the multiple images;
calculating frequency of appearance of a subject per type of subject included in each image with regard to the multiple images;
calculating a composition evaluation value per type of composition in the multiple images from the calculated frequencies of appearance of the compositions;
calculating a subject evaluation value per type of subject in the multiple images from the calculated frequencies of appearance of the subjects;
finding, for each of the multiple images, an individual image composition/subject matrix having two axes one of which is an axis of multiple compositions and the other of which is an axis of the multiple subjects, wherein a value of 1 is taken on in a case where one composition and one subject exist and a value of 0 is taken on otherwise;
finding a composition evaluation matrix comprising one row or one column using the calculated composition evaluation values;
finding a subject evaluation matrix comprising one row or one column using calculated the subject evaluation values;
calculating an image evaluation value with regard to each of the multiple images using a matrix product of the individual image composition/subject matrix, the composition evaluation matrix and the subject evaluation matrix;
deciding n-number of images for which the image evaluation value is large, where n represents a natural number; and
displaying the n-number of images on a display screen.

10. A non-transitory recording medium storing a computer-readable program for controlling a computer of an image evaluation system so as to:
subject multiple images to composition information acquisition processing for acquiring composition information representing the type of composition of each image;
subject the multiple images to subject information acquisition processing for acquiring subject information representing the type of subject included in each image;
calculate frequency of appearance of a composition per type of composition with regard to the multiple images;
calculate frequency of appearance of a subject per type of subject included in each image with regard to the multiple images;
calculate a composition evaluation value per type of composition in the multiple images from the calculated frequencies of appearance of the compositions;
calculate a subject evaluation value per type of subject in the multiple images from the calculated frequencies of appearance of the subjects;
find, for each of the multiple images, an individual image composition/subject matrix having two axes one of which is an axis of multiple compositions and the other of which is an axis of the multiple subjects, wherein a value of 1 is taken on in a case where one composition and one subject exist and a value of 0 is taken on otherwise;
find a composition evaluation matrix comprising one row or one column using the calculated composition evaluation values;
find a subject evaluation matrix comprising one row or one column using the calculated subject evaluation values;
calculate an image evaluation value with regard to each of the multiple images using a matrix product of the individual image composition/subject matrix, the composition evaluation matrix and the subject evaluation matrix;
decide n-number of images for which the image evaluation value is large, where n represents a natural number; and
displaying the n-number of images on a display screen.

* * * * *